Patented Oct. 6, 1925.

1,555,940

UNITED STATES PATENT OFFICE.

AUGUST BÜLTEMANN, OF DRESDEN, GERMANY.

PROCESS OF MAKING INSULATORS.

No Drawing.   Application filed January 2, 1924.   Serial No. 684,072.

*To all whom it may concern:*

Be it known that I, AUGUST BÜLTEMANN, a citizen of Germany, residing at Dresden, Germany, have invented certain new and useful Improvements in Processes of Making Insulators, of which the following is a specification.

My invention refers to the installation of electric lines and more especially to the manufacture of insulators composed of several parts and its particular object is a method of composing such insulators and uniting their several parts in a more reliable manner than has hitherto been possible.

The overhead line insulators, wall ducts and the like, being composed of several parts, have been found to become soon defective by cracking, resulting in a short-circuiting of the line, this drawback being caused by the material, such as cement or the like, employed in jointing the several parts of the insulator consisting of porcelain, steatite or the like and the metallic parts such as caps, hoods and so forth.

It has been ascertained that the greater specific expansion of the cement or other hydraulic binders employed and which by far exceeds the coefficient of expansion of porcelain, gives rise to tensions which cause the porcelain to crack. To overcome this drawback, it has been proposed to add to the cement substances adapted to reduce its expansion, but these propositions have not proved to be successful.

I have succeeded in successfully dealing with the difficulties arising from the high expansion of the cement or other hydraulic binder by adding to it substances having the property of repelling the water. In this manner the binding of the cement, which requires a certain time after water has been added to it, can be reduced to the proper moment, whereby the expansion of an undue pressure on the porcelain is prevented.

In order to further prevent the binder from taking up humidity from the outside and thereby expanding anew, I prefer subjecting the insulators comprising a binder, to which substances, such as mentioned above, have been added, to the action of heat, thereby causing these substances to enter the pores of the cement and to envelop the individual particles of the cement which are thus prevented from reacting further. Preferably, this heating step is regulated gradually in such manner that all the humidity in excess and all volatile constituents, such as solvents and gases, are expelled before the water repelling substance has been capable of surrounding the single particles.

In carrying out my invention, I may for instance proceed as follows. To the cement, such as Portland cement, which shall be used for jointing together the single parts of an insulator, I admix, besides the quantity of water required by the cement in question, some percent of one or several water repelling substances, such as pitch, sulphur, resins, bitumen, asphalt or other hydro-carbons, these substances being added either as finely pulverized solids or in liquid state, being dissolved in suitable solvents, such as for instance alcohols, oils, liquid hydro-carbons or the like. As a rule, I prefer employing a mixture of solid and liquid water repelling means of the kind aforesaid. Besides the substances mentioned above, I can employ also alkaline and other suspensions of resins, resin soaps, wax-like substances and the like which tend to separate off water repelling substances. I may further use oils or lacquers capable of either solidifying themselves or leaving solid bodies behind in the pores of the hardened cement.

With a binder prepared in accordance with the above indications, the porcelain and metal parts of the insulators are now jointed together and after a few weeks the binder will have hardened sufficiently. However, the process of hardening proceeds further under the action of the humidity taken up from the atmosphere and, in order to prevent this from taking place, I heat it as mentioned above in order to cause the water repelling substance or substances to enter the pores of the cement and to envelop the individual particles of the cement, thereby preventing the humidity from reacting further with the cement. Owing to the character of the substances admixed to the cement, this latter obtains a certain elasticity which counteracts all tendencies of exerting pressure on the porcelain.

In heating the insulators as specified above, I have found it advisable to apply little heat so long as there are still traces of humidity and volatile substances, such as solvents and gases left in the binder. For I have ascertained that by this step of slowly preheating the cement, this latter will harden quicker than otherwise and will attain a final state of the highest possible strength, wherein its pores are open. After this state has been reached, I heat to a higher temperature, whereby liquid or liquified substances present in the cement are induced to enter the pores and to envelop the individual particles.

In practicing my invention, I may use a binder having one of the following compositions, for instance;

1. 70 parts cement, 8 parts asphalt, 2 parts benzol, 20 parts water.
2. 70 parts cement, 5 parts carnauba wax, 5 parts ammonia, 20 parts water.
3. 70 parts cement, 5 parts lacquer, 5 parts turpentine, 20 parts water.
4. 70 parts cement, 5 parts resin, 5 parts alcohol, 20 parts water.
5. 70 parts cement, 4 parts colophonium, 4 parts alum, 2 parts turpentine, 20 parts water.

An insulator cemented with a binder composed as before is for instance heated at the lapse of 4–6 weeks during a few hours to a temperature gradually rising from 40 to 100° and thereafter for several hours from 100 to 110° and finally to temperatures rising from 130 to 160°, when the water repelling substance will become thinly fluid and will envelop the cement.

I may, however, also heat the insulator, a few days after it has been cemented together, to 60° during several hours, subjecting it afterwards, according to the kind of water repelling substance used, to the action of reduced pressure and simultaneously heating it to 100°. Finally, after the humidity and gases have been expelled, I heat it for one to two hours to the temperature at which the water repelling medium will become thinly fluid, this temperature, as a rule, ranging between 130 and 160° C.

I wish it to be understood that I do not desire to be limited to the exact sequence of steps and to the particular proportions and substances mentioned above, as obvious modifications will occur to a person skilled in the art.

I claim:—

1. The method of making composite electric insulators which consists in cementing the several parts of the insulator by means of a hydraulic binder to which a water repelling substance and a solvent for same has been admixed.

2. The method of making composite electric insulators which consists in cementing the several parts of the insulator by means of a hydraulic binder to which a water repelling substance and a solvent for same has been admixed and heating the cemented parts to a temperature below the melting point of said substance.

3. The method of making composite electric insulators which consists in cementing the several parts of the insulator by means of a hydraulic binder to which a water repelling substance has been added and heating the cemented parts in two operations to different temperatures below the melting point of said substance, and thereafter to a temperature at which this substance becomes thinly fluid.

4. The method of making composite electric insulators which consists in cementing the several parts of the insulator by means of a hydraulic binder to which a water repelling substance and a solvent for same has been admixed and heating the cemented parts in two operations to different temperatures below the melting point of said substance and thereafter to a temperature at which this substance becomes thinly fluid.

5. The method of making composite electric insulators which consists in cementing the several parts of the insulator by means of a hydraulic binder to which a solution of a water repelling substance has been added.

6. The method of making composite electric insulators which consists in cementing the several parts of the insulator by means of a hydraulic binder to which a substance has been added which, on heating, is converted into a water repelling substance.

In testimony whereof I affix my signature December 17, 1923.

AUGUST BÜLTEMANN.